United States Patent Office 3,336,113
Patented Aug. 15, 1967

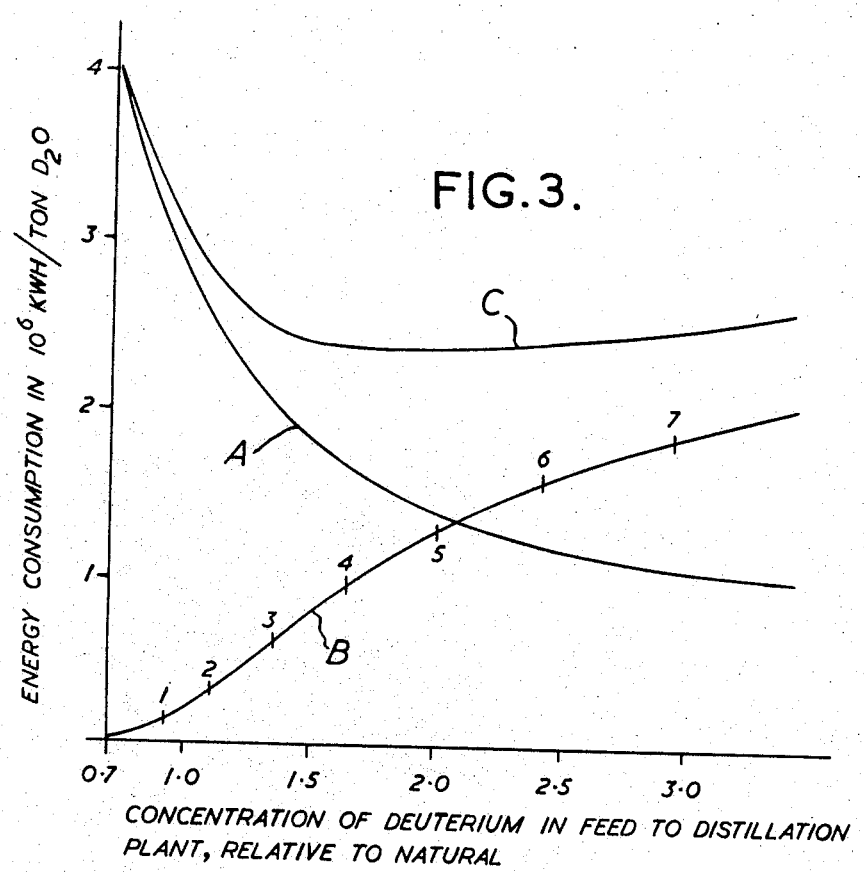

3,336,113
HYDROGEN ISOTOPE EXCHANGE PROCESSES
William Havelock Denton, Harwell, and Douglas Handley, Blewbury, Berkshire, England, and Henry Reginald Clive Pratt, Melbourne, Victoria, Australia, assignors to the United Kingdom Atomic Energy Authority, London, England
Filed Apr. 24, 1958, Ser. No. 730,621
Claims priority, application Great Britain, Apr. 24, 1957, 13,027/57
3 Claims. (Cl. 23—210)

This application is a continuation-in-part of Ser. No. 670,231, filed July 5, 1957, and now abandoned.

This invention relates to chemical exchange processes for the production of heavy water, that is, water which has an enriched deuterium content.

More particularly it relates to an improved process for the concentration of deuterium by chemical exchange reactions. The product of such a concentration process may be hydrogen, water, ammonia, or other hydrogen-containing compound, which has an enriched deuterium content relative to the natural concentration of deuterium (about 145 parts of deuterium per million parts of hydrogen). When the product of the process is water, no further conversion process is required for heavy water production, but when the product is any other hydrogen-containing compound conversion to water is necessary, e.g., hydrogen may be combined with oxygen to yield the heavy water product.

Many exchange processes have been proposed for heavy water production and of those the $H_2$–$H_2O$, $H_2$–$NH_3$ and $H_2S$–$H_2O$ reactions appear to be the most favourable and have high separation factors. Technologically, processes employing chemical exchange can be carried out in one of two ways, i.e., by the single-tower process, and by the two-tower dual-temperature process. The single-tower process is in principle the simplest and closely resembles ordinary distillation; it has the disadvantage, however, that the provision of reflux requires the chemical conversion of each outgoing stream at the tower terminals into the other; thus, in the case of $H_2$–$H_2O$ exchange it is necessary to convert enriched water into hydrogen at one end of the cascade, and, if a high degree of extraction is required, depleted hydrogen into water at the other end. Convenient processes for this purpose are generally not available (particularly in the case of $H_2S$–$H_2O$ exchange), and for this reason the dual-temperature process has been proposed.

In a dual-temperature process, two exchange towers are employed, operating at different temperatures, at one of which deuterium is enriched in one of the streams and at the other the deuterium is partially stripped from this stream into the other stream due to the diminution in the separation factor for the exchange process at that temperature. These towers are connected in series so that the deuterium is concentrated between the towers, deuterium-enriched product being withdrawn from either stream from a point between the two towers. For example, at 30° C. chemical exchange between $H_2O$ and $H_2S$ leads to enrichment of deuterium in the $H_2O$ while at 130° C. part of this deuterium is stripped back into the $H_2S$ stream. By connecting two towers operating at these two temperatures in series so that the deuterium enriched phase in each tower flows towards the other tower, a deuterium-enriched product may be withdrawn from either the $H_2O$ or the $H_2S$ stream from a point between the towers, and also reflux of materials is automatically provided at the enriched end of each tower. Such pairs of towers may also be operated in cascade to produce further enrichment.

The $H_2S$–$H_2O$ exchange process has somewhat less favourable equilibria than the $H_2$–$H_2O$ or $H_2$–$NH_3$ processes, but has the advantage that the reaction is ionic and takes place on an ordinary bubble-plate or packed column. This process requires, however, about 15,000–30,000 tons of steam per ton of heavy water produced, mainly for humidification of the gas in the hot tower, and the $H_2S$ is of a corrosive nature. As a result, alloy steels need to be employed extensively so that the capital cost is high.

In 1950, it was discovered that potassamide could be used as a homogeneous catalyst for the ammonia-hydrogen exchange reaction, thus enabling the use of ordinary bubble plates or packed columns. Further work has shown that the reaction takes place at an appreciable rate on bubbling hydrogen through liquid ammonia, even at —60° C., so that a dual-temperature two-tower process is feasible for this reaction also. However, a complication arises in that the raw material must be supplied in the form of ammonia, and to obtain unlimited production it is necessary to contact the stripped ammonia with natural water in a separate exchange tower. The exchange constant for this reaction is close to unity so that the ammonia re-enters the process at near to natural concentration. The ammonia-water exchange reaction may be carried out in a tower which comprises essentially a conventional ammonia-water distillation column with an additional section in the vicinity of the feed in which the exchange reaction takes place. This tower consumes a fair amount of steam and for maximum economy it is preferable to employ the waste heat from this tower for other purposes, e.g., saturation of the gas in a hot tower. It is also necessary to recover the potassamide catalyst by evaporation of the depleted ammonia stream (into the ammonia-water exchange tower), so that the potassamide concentrate can be mixed with the re-enriched feed, and secondly to dehydrate completely the re-enriched ammonia stream from the ammonia-water exchange tower, so that hydrolysis of the catalyst is avoided.

The ammonia-hydrogen exchange process may also be carried out in a single-tower plant, in which case reflux may be provided by cracking of the enriched ammonia at the base of the tower. By operating under a high pressure, i.e., 200–500 atms., the cracked gas ($3H_2+N_2$) leaving the tower may be re-combined in a conventional synthesis plant and the stripped ammonia thus formed contacted with water in a separate tower to provide re-enriched feed.

The reaction between water and hydrogen gives separation factors almost identical with those of the ammonia system at comparable temperatures, although it is restricted to a higher temperature range. It possesses the disadvantage, however, that no satisfactory homogeneous catalyst has yet been devised. For this reason it is not possible to employ normal contacting columns and a type of tower known as a "Trail" tower, comprising alternate bubble plates and vapourphase catalyst beds, has been devised for this purpose and used in the wartime plant at Trail, B.C., Canada. It is not possible, however, to employ these towers alone in a dual-temperature process unless the pressure of the gas is changed between the towers, since it is necessary to maintain the correct ratio of water vapour to hydrogen in the gas stream entering the catalyst beds at the two temperatures. To overcome this difficulty, a process has been devised in which a single high temperature exchange catalyst bed together with a stripping column is employed in conjunction with a "Trail" tower to form a dual-temperature unit. The enrichment obtained by such a unit is strictly limited, and it has therefore been proposed that these units be arranged as a cascade in order to obtain the necessary high degree of enrichment.

It has now been realised that a distillation process, e.g., hydrogen, ammonia, or even water distillation may be employed, with advantageous results, for the further enrichment of the product of a single stage, or a small number of stages, of such dual-temperature exchange, rather than to employ a cascade of a large number of dual-temperature stages. One particularly relevant problem in this connection is that of minimising the losses from the circulating gas stream, which is usually under pressure. In the first stage of a cascade exchange plant the gas is depleted relative to the natural deuterium concentration, since the equilibrium always favours the liquid phase, and losses are of little account, but in succeeding stages the gas is enriched so that the effect of losses is then serious.

According to the invention, a process for producing heavy water comprises operating a dual-temperature exchange process to produce a product enriched in deuterium relative to the feed to said exchange process, subjecting said product to further enrichment by a distillation process, and recycling the deuterium-depleted waste from said distillation process to said dual-temperature exchange process, and if necessary converting the product of said distillation process to heavy water.

More particularly, a process for producing heavy water comprises operating a water-hydrogen or ammonia-hydrogen dual-temperature exchange process to produce hydrogen enriched in deuterium relative to the feed to said exchange process, subjecting said deuterium-enriched hydrogen to further enrichment by a distillation process, and recycling the deuterium-depleted waste hydrogen from said distillation process to said dual-temperature exchange process, and converting the further enriched hydrogen product of the said distillation plant to heavy water. Such conversion is carried out by known means.

It is well known to produce hydrogen highly enriched in deuterium from ordinary hydrogen by the distillation of purified hydrogen at a very low temperature, i.e., 20° K. (absolute temperature). An example of such a process and apparatus therefore is described in copending application Ser. No. 666,509, now Patent No. 2,960,838. The cost of operation of this process is favourable for a feed "borrowed" from limited sources of nearly pure hydrogen gas, e.g., "electrolytic" hydrogen, or from other limited sources of impure gas, e.g., ammonia synthesis gas, in which it must be separated from nitrogen and other gases.

It is advantageous to obtain potentially unlimited production by using a deuterium feed from a natural source, e.g., water, but when this principle is applied to hydrogen distillation the production cost has hitherto been assessed to be too high. A deuterium feed can be obtained from water by a simple high temperature transfer process linked to the hydrogen distillation plant operating on a closed cycle, but the feed derived from such a process is depleted in deuterium content. For example, a deuterium transfer process operated at a maximum temperature of 600° C. to equilibrate depleted hydrogen from the distillation plant with natural water yields a hydrogen feed which has a deuterium content only 0.7 of the natural concentration. This leads to a corresponding increase in the production cost of the whole plant.

It has now been further discovered that the overall production cost of such a closed cycle distillation plant linked with a high temperature deuterium transfer is reduced to a minimum by supplying as feed to the distillation plant hydrogen which has been enriched above natural deuterium concentration by a factor of between about 1.3 and 3.0 by means of a suitable preliminary enrichment process, in particular a dual-temperature water-hydrogen exchange process. By this means, the cost of operation of the distillation plant to produce enriched hydrogen is substantially reduced, while only a relatively small cost of operation of the dual-temperature exchange process is added for preliminary enrichment.

According to the present invention, a process for the production of heavy water comprises supplying water of natural deuterium concentration to a dual-temperature water-hydrogen chemical exchange process to produce hydrogen enriched in deuterium above natural deuterium concentration by a factor of between about 1.3 and 3.0, subjecting said enriched hydrogen to a distillation process, recycling the depleted hydrogen waste from the distillation process to the dual-temperature exchange process through a high temperature deuterium transfer apparatus in which said depleted hydrogen is equilibrated with water of natural deuterium concentration, and converting the deuterium-enriched hydrogen product of the distillation process to heavy water.

The enrichment of the hydrogen by the dual-temperature exchange process reduces the overall energy consumption of the whole process to a level below that of a hydrogen distillation plant fed with depleted hydrogen from a simple high temperature transfer process, and also below that of a dual-temperature water-hydrogen chemical exchange process carrying out all the enrichment itself. It may also be such as to reduce the overall energy consumption of the process to below that of hydrogen distillation fed with "borrowed" hydrogen, e.g., from ammonia synthesis gas.

Limitation of the enrichment of the hydrogen feed to the distillation process is necessary, since the dual-temperature exchange process would otherwise require a large number of stages and become complex and costly for large enrichments, and since it is also inherently more energy-consuming than hydrogen distillation for an equivalent degree of enrichment. It can be shown that there is an optimum enrichment of the hydrogen feed to the distillation process for minimum energy consumption, and that this optimum is in practice around 1.5 times natural deuterium concentration.

The advantages of the combination in this way of a duel-temperature preliminary enrichment process and hydrogen distillation for heavy hydrogen production are (inter alia):

*Firstly*, the energy consumption of the process is substantially reduced compared with that of hydrogen distillation fed with hydrogen recycle through a simple water-hydrogen high temperature deuterium transfer process;

*Secondly*, its energy consumption compares favourably with that of the limited production of heavy hydrogen from the impure hydrogen "borrowed" from commercial sources, e.g., ammonia synthesis gas, and, in particular, it eliminates the major low temperature gas purification problems associated with such a synthesis gas food; and

*Thirdly*, the supply of feed material, i.e., natural water, is unlimited, so that (a) the potential production of the process is unlimited and (b) the location of the plant to carry out the process is not restricted, both of these factors giving a distinct advantage over operation with "borrowed" hydrogen.

These advantages result in part from the presence of an inherently efficient deuterium stripping step in the process, namely hydrogen distillation, which can provide 90% extraction of deuterium from its feed, and also from the realisation that a comparatively small enrichment of this feed can be efficiently provided from an unlimited source by the dual-temperature water-hydrogen exchange process.

The nature of the invention will be more readily apparent if reference is made to the accompanying drawings, in which:

FIG. 3 is a graphical representation of the energy consumption of the process shown in FIG. 2.

Figure 1:
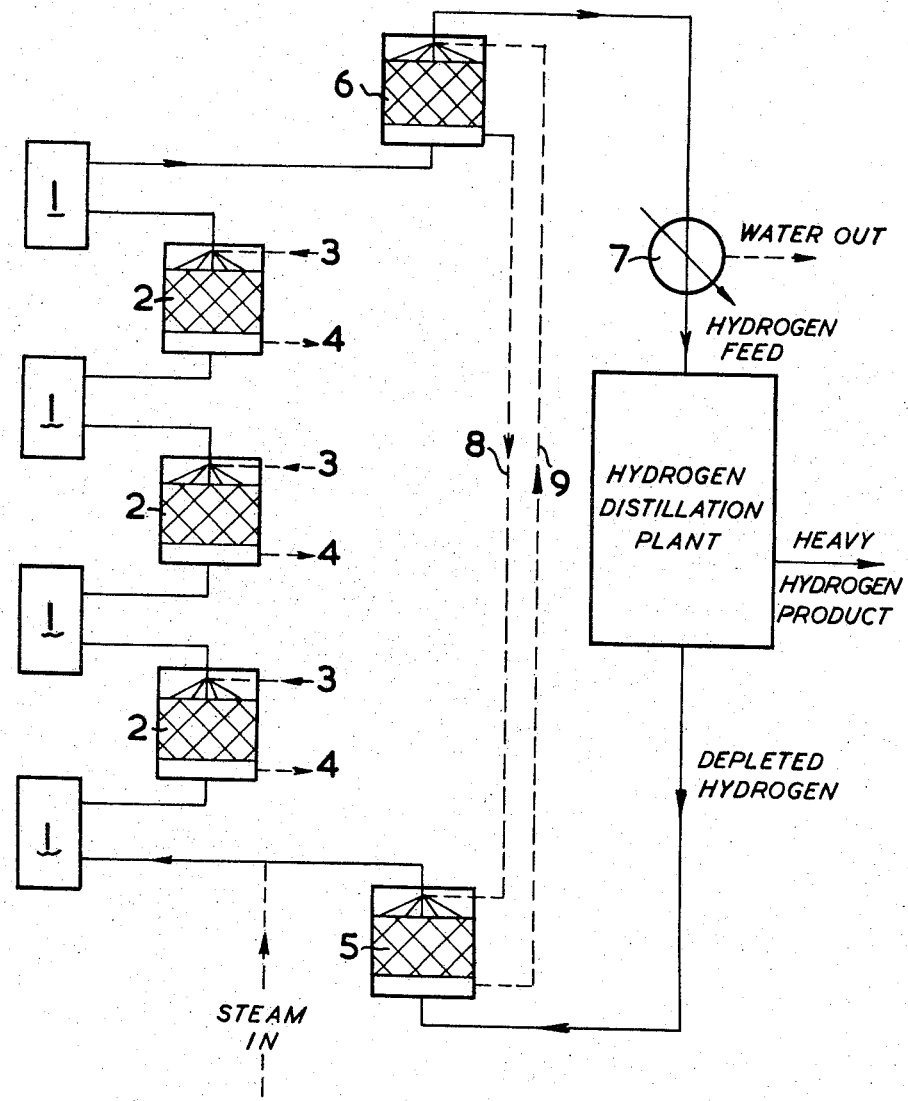
FIG. 1 is a flow diagram of a heavy hydrogen production process consisting of hydrogen distillation fed with hydrogen recycled through a simple high temperature deuterium transfer process.

In FIGURE 1, the hydrogen feed to the hydrogen distillation plant is supplied by a straightforward high-temperature deuterium transfer plant consisting of a number of high-temperature catalyst units 1 arranged alternately and in series with water-steam exchange columns 2. The catalyst units 1 are preferably provided with associated regenerators and superheaters, and are preferably constructed in accordance with the invention described in copending application Ser. No. 729,599. Water feed is provided at points 3 and depleted water outlet is provided at points 4. Depleted hydrogen from the hydrogen distillation plant is passed through a humidifier 5 and thence through the catalysts units 1 and exchange columns 2 to a dehumidifier 6, before being recycled as feed to the hydrogen distillation plant via a condenser 7. Heat recovery between the humidifier 5 and dehumidifier 6 is represented by the flow lines 8 and 9 and is preferably achieved by the process described in copending application Ser. No. 694,821, now Patent No. 3,019,610. Hydrogen distillation plant suitable for incorporation in this flow diagram has been described in copending application Ser. No. 666,509. The heavy hydrogen product of such a plant may be easily converted into heavy water by known methods, e.g., by burning with oxygen.

If the catalyst units 1 are operated with a maximum temperature of 600° C. and the exchange columns 2 at 136° C., then the depleted hydrogen from the hydrogen distillation plant will be re-enriched only to a deuterium content of 0.7 of natural before feeding to the distillation plant again. Thus the distillation plant operates on a feed of hydrogen containing only 0.7 of the natural concentration of deuterium.

The energy consumed by the apparatus shown in FIG. 1, operating to prodce heavy hydrogen in the form of hydrogen containing 700 times the natural concentration of deuterium, can be shown to be $4 \times 10^6$ kilowatt-hours (equivalent power consumption) per ton of heavy water ultimately produced thereby.

Figure 2:
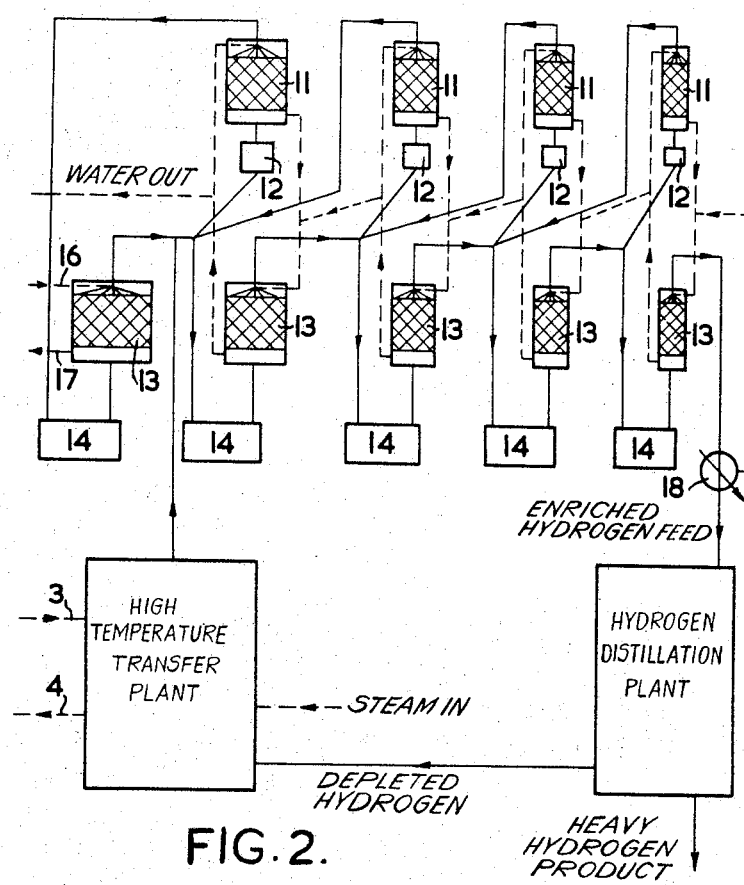
FIG. 2 is a flow diagram of one embodiment of the present invention.

Referring now to FIG. 2, enriched hydrogen feed to the distillation plant is now supplied from a water-fed preliminary enrichment plant, comprising a conventional tapered cascade of dual-temperature water-hydrogen exchange separating elements, which is itself supplied with hydrogen with a deuterium content 0.7 of natural from a high temperature deuterium transfer plant as described in relation to FIG. 1. Each separating element of the cascade comprises an enriching section through which an enriched fraction of steam-hydrogen mixture passes up the cascade, and a depleting section through which a depleted fraction of steam-hydrogen mixture passes down the cascade. Each enriching section comprises a water-steam exchange tower 13 and a hot catalyst unit 14. Each depleting section comprises a water-steam exchange tower 11 and a cold catalyst unit 12. In the hot catalyst beds 14 operated at, for example, 600° C. deuterium passes from the steam to the hydrogen, and in the exchange towers 13 deuterium in turn passes from the water to the steam. The resulting depleted water from the exchange towers 13 flows in closed loops between the exchange towers 13 and 11 and is replenished in deuterium in the exchange towers 11, where deuterium also passes from the water to the steam having passed from the hydrogen to the steam in the cold catalyst units 12.

The hot catalyst units 14 are again preferably of the type described in copending application Ser. No. 729,599.

Water feed to the high-temperature deuterium transfer plant is supplied at 3 and water outlet at 4, as described in relation to FIG. 1, while water feed to the dual-temperature exchange plant is supplied at point 16 and water outlet at point 17.

Depleted hydrogen from the hydrogen distillation plant is passed through the high temperature deuterium transfer plant exactly as described in relation to FIG. 1, and thence to the dual-temperature exchange plant which enriches the hydrogen to the desired degree. This enriched hydrogen is then fed to the hydrogen distillation plant through a condenser 18.

If the catalyst units and exchange columns in the high temperature transfer plant are again operated at 600° C. and 136° C., respectively, then the depleted hydrogen from the hydrogen distillation plant will again be re-enriched to 0.7 of natural deuterium content for feeding to the dual-temperature exchange preliminary enrichment plant. If the hot and cold catalyst units of the latter are operated at 600° C. and 140° C., respectively, then the hydrogen from the transfer plant can be enriched, for example, to 1.4 of natural deuterium content in a small number of stages before feeding to the distillation plant. Thus the feed of deuterium to the distillation plant is doubled and the energy consumption of the latter in producing the same quantity of deuterium is halved. The energy consumption of the preliminary dual-temperature exchange plant in achieving the initial enrichment from 0.7 to 1.4 of natural deuterium content is substantially less than the reduction of energy consumption by the distillation plant, so that a net reduction in energy consumption is achieved. The total energy consumed by the apparatus according to the invention, shown in FIG. 2, operating to produce heavy hydrogen in the form of hydrogen containing 1400 times the natural concentration of deuterium, can be shown to be $2.4 \times 10^6$ kilowatt-hours equivalent power consumption per ton of heavy water ultimately produced thereby. This is only 60% of that consumed by the apparatus of FIG. 1.

The exact value of the energy consumption of this combination of a dual-temperature exchange plant with a hydrogen distillation plant depends on the degree of enrichment achieved in these two plants, respectively. It is not necessary for the intrinsic cost of enrichment by the preliminary dual-temperature exchange plant to compare favourable with that of the distillation plant itself. Nearly all (about 90%) of the deuterium fed into the main hydrogen stream in the exchange plant is eventually separated by the distillation plant, whereas the exchange plant only has to add this deuterium to the stream at a relatively low concentration level, which requires only a small fraction of the total work of separation. This is shown graphically in FIGURE 3, which shows the energy consumptions of (A) hydrogen distillation plant enriching a hydrogen feed by a factor of 1000 in deuterium content as a function of the deuterium concentration of the feed; (B) dual-temperature exchange plant enriching hydrogen from 0.7 of natural deuterium concentration up to this feed concentration; and (C) the combination of (A) plus (B) which shows a minimum in energy consumption around a feed concentration of about 1.5 of natural. Furthermore, by increasing the size of the preliminary dual-temperature exchange plant only, i.e., by increasing the number of stages, and operating the distillation plant with a feed concentration of up to 2 or 3 times natural deuterium concentration, the production of a distillation plant may be considerably increased with only a small increase in total energy consumption per ton of heavy water produced. The figures on curve (B) show the number of stages required in the prelimininary dual-temperature exchange plant to achieve the corresponding enrichment of the hydrogen feed to the distillation plant. It is advantageous that this number be small. It can be seen that the energy consumption of the combined plants is substantially less than that of the distillation plant alone and is at a minimum when the feed concentrtaion is between about 1.3 and about 3.0 times natural deuterium concentration.

A conventional tapered cascade of hot and cold separating elements is the cheapest mode of operation of this preliminary enrichment plant, since this corresponds to the minimum integrated total flow of gas mixture to be handled in the plant. The size of the plant and its total energy consumption (including that due to heat exchanger inefficiencies, and pressure losses) are both proportional to this integrated flow. It also provides a convenient process for this initial small enrichment where large quantities of material have to be turned over, but in a small number of stages of steadily decreasing sizes.

Such a conventional cascade plant has the characteristic that the integrated plant size and energy consumption is approximately proportional to $(\Delta C)^2$ for the low enrichments involved, where $\Delta C$ is the increase in deuterium concentration of the hydrogen passing through the cascade. Thus the cost of this preliminary enrichment process rises as approximately the square of the increase in deuterium production it enables a hydrogen distillation plant to provide. Initial enrichment is thus cheap and there is an optimum size, i.e., number of stages, of the preliminary enrichment plant and a corresponding optimum feed concentration to the distillation plant (as shown in FIG. 3), giving a minimum total combined production cost of the combined plants. This optimum depends on the relative costs of the two processes, and the minimum production cost will be substantially less than that of either a hydrogen distillation plant operated in a closed cycle alone (as described in relation to FIG. 1) or such dual-temperature exchange process alone carrying out all the deuterium separation.

This preliminary enrichment plant can have another mode of operation suitable for coupling with a heavy water production plant which requires a high pressure hydrogen feed and also rejects depleted hydrogen at the high pressure. This high pressure may be 100 atmospheres, for example in an ammonia-hydrogen exchange process linked with a water feed. This pressure is too high for circulation through this preliminary enrichment plant. Under these conditions of high pressure, the water and the steam-hydrogen mixture each flow in closed loops, with total reflux of materials. The enriched water in the loop at the top of the dual-temperature cascade is compressed to 100 atmospheres (without appreciable power consumption) and the deuterium transferred to the main 100 atmospheres hydrogen stream in a final single stage transfer plant at this pressure, the water then returning to the top of the cascade to complete its closed loop. In this mode of operation this final transfer plant is an extra requirement.

A further improvement in the invention consists in the use of pressures above atmospheric, e.g., 10 atmospheres for the transfer plant and dual-temperature water-hydrogen exchange plant. This provides a substantial reductions in plant size and capital cost, which is only partly ocset by a reduction in separation factor per stage of the dual-temperature plant due to the resulting increase in the cold exchange temperature in the cold catalyst units 12, e.g., to 140° C. as described in relation to FIGURE 2.

One specific embodiment of the invention, comprising a hydrogen distillation process fed by an enriched hydrogen feed from a dual-temperature water-hydrogen exchange process, has been described with reference to the accompanying drawings. The invention, however, is not limited in scope to this embdiment. Although hydrogen distillation is preferred, ammonia or water distillation may also be employed; and although water-hydrogen exchange is employed in the dual-temperature process to supply hydrogen feed to the distillation process in this embodiment, the same exchange process or water-$H_2S$ exchange may be employed in the dual-temperature process to supply water to a water distillation process, or ammonia-hydrogen exchange may be employed to supply hydrogen to a hydrogen distillation process or to supply ammonia to an ammonia distillation process. All these combinations are within the scope of the invention.

We claim:
1. A process for the production of a deuterium enriched product fraction comprising:
   (1) effecting a dual-temperature hydrogen isotope exchange process between reactant pairs selected from the group of reactant pairs, water-hydrogen; and ammonia-hydrogen, wherein a first stream comprising the first reactant of said reactant pair is passed through a first isotope exchange stage and thence through a second isotope exchange stage maintained at a higher temperature than said first isotope exchange stage and a second stream of hydrogen is passed in isotope exchange relationship through the second isotope exchange stage and thence to the first isotope exchange stage whereby a deuterium enriched first stream passes from said first exchange stage to said second exchange stage, and a deuterium enriched hydrogen stream passes from said second exchange stage to said first exchange stage;
   (2) withdrawing a deuterium enriched hydrogen intermediate from the enriched hydrogen stream passing from said second to said first exchange stage;
   (3) subjecting said deuterium enriched hydrogen intermediate to distillation to yield a product fraction further enriched in deuterium content and a waste fraction having a deuterium content depleted relative to the natural deuterium content;
   (4) effecting hydrogen isotope exchange between said waste fraction and steam of natural deuterium concentration at a high temperature to increase the deuterium content of said waste fraction; and then
   (5) recycling said waste fraction to said dual-temperature hydrogen isotope exchange process to form the hydrogen stream therein.

2. A process for the production of deuterium-enriched hydrogen which comprises the steps of:
   (1) feeding water of natural deuterium content into a dual-temperature exchange process in which a stream of said water flows countercurrently to a stream of hydrogen in two different stages in each of which hydrogen isotope exchange is effected between said water and said hydrogen, said water flowing from the colder to the hotter of said stages and said hydrogen flowing from the hotter to the colder of said stages;
   (2) withdrawing hydrogen having a deuterium content increased above the natural deuterium concentration by a factor in the range from 1.3 to 3.0 from said dual-temperature exchange process;
   (3) subjecting said hydrogen having an increased deuterium content to distillation to yield a product fraction having a further increased deuterium content and a waste fraction having a depleted deuterium concentration relative to the natural deuterium concentration;
   (4) effecting hydrogen isotope exchange between said waste fraction and steam of natural deuterium concentration at as high a temperature as practicable to increase the deuterium content of said waste fraction; and then
   (5) recycling said waste fraction to said dual-temperature exchange process to form the hydrogen stream therein.

3. A process for the production of deuterium enriched hydrogen which comprises:
   (1) subjecting a stream of water of natural deuterium content to the countercurrent flow of a first stream of hydrogen through two distinct stages of a dual-temperature stage deuterium exchange process wherein the first stage comprises a high temperature catalytic unit and associated water-steam exchange tower and the second stage comprises a low temperature catalytic unit and associated water-steam exchange tower, said water flowing from the colder to the hotter stage and said hydrogen flowing from the hotter to the colder stage to increase the deuterium content of the hydrogen stream,
   (2) subjecting the enriched hydrogen stream to distillation to yield a product fraction of further enriched deuterium content and a waste fraction of depleted hydrogen content;

(3) subjecting the waste fraction to contact with steam at a high temperature to increase the deuterium content of the waste fratcion; and (4) recycling said waste fraction to said first low temperature stage of said dual temperature exchange process to form said first hydrogen stream.

References Cited

UNITED STATES PATENTS

| | | | |
|---|---|---|---|
| 2,787,526 | 4/1957 | Spevack | 23—204 |
| 2,908,554 | 10/1959 | Hoogschagen | 23—204 X |
| 3,087,791 | 4/1963 | Becker | 23—204 |

OTHER REFERENCES

Becker: Angewandte Chemie, vol. 68, pp. 10–12 (January 1956.)

Proceedings of the International Conference on the Peaceful Uses of Atomic Energy, 1956. vol. 8, pp. 399–401.

Proceedings of the International Conference on the Peaceful Uses of Atomic Energy, vol. 8, p. 384, pub. by United Nations, 1956.

Selak et al.: Chemical Engineering Progress, vol. 50, No. 5, pp. 221–229 (May 1954).

OSCAR R. VERTIZ, *Primary Examiner.*

GEORGE D. MITCHELL, MAURICE A. BRINDISI, BENJAMIN HENKIN, *Examiners.*

M. WEISSMAN, *Assistant Examiner.*